United States Patent [19]

Buchwalter Stephen L.

[11] Patent Number: 4,504,630

[45] Date of Patent: Mar. 12, 1985

[54] ACRYLIC POLYMERS AND THE MICHAEL ADDUCTS THEREOF USEFUL IN COATING APPLICATIONS

[75] Inventor: Buchwalter Stephen L., Allison Park, Pa.

[73] Assignee: PPG Industries, Inc., Pittsburgh, Pa.

[21] Appl. No.: 305,866

[22] Filed: Sep. 28, 1981

Related U.S. Application Data

[63] Continuation of Ser. No. 159,578, Jun. 16, 1980, Pat. No. 4,330,640.

[51] Int. Cl.³ ............................................. C08F 265/10
[52] U.S. Cl. ..................................................... 525/296
[58] Field of Search ................. 525/296; 526/304, 306

[56] References Cited

U.S. PATENT DOCUMENTS

| | | | |
|---|---|---|---|
| 2,475,846 | 7/1949 | Lundberg | 260/561 |
| 2,576,501 | 11/1951 | Dalton | 260/561 |
| 2,576,502 | 11/1951 | Dalton | 260/89.7 |
| 3,061,595 | 10/1962 | Dorion et al. | 260/80.5 |
| 3,369,007 | 2/1968 | Flodin | 260/80.3 |
| 3,799,910 | 3/1974 | Shingai et al. | 260/78.5 UA |
| 3,803,091 | 4/1974 | Murfin | 260/561 N |
| 4,093,677 | 6/1978 | Ferruti et al. | 260/858 |
| 4,105,518 | 8/1978 | McGinniss | 204/139.14 |

Primary Examiner—Paul R. Michl
Attorney, Agent, or Firm—Godfried R. Akorli

[57] ABSTRACT

Novel acrylic polymers with pendant unsaturation are disclosed. Also disclosed is a wide variety of amine-containing acrylic resinous compositions prepared therefrom. These compositions are useful for coating applications, particularly cationic electrodeposition. An inexpensive method of preparing the resinous compositions of this invention is provided.

6 Claims, No Drawings

ACRYLIC POLYMERS AND THE MICHAEL ADDUCTS THEREOF USEFUL IN COATING APPLICATIONS

This is a continuation of application Ser. No. 159,578, filed June 16, 1980, now U.S. Pat. No. 4,330,640.

BACKGROUND OF THE INVENTION

1. Field of the Invention

The present invention relates to curable resinous compositions. More specifically, the present invention relates to novel polymers, particularly acrylic polymers useful in preparing resinous compositions which are suitable for use in coating applications, particularly cationic electrodeposition.

2. Brief Description of the Prior Art

It is known in the art that resinous materials, such as acrylic resinous materials can be solubilized in water, using cationic solubilizing groups such as amine salt groups. Such resinous materials can be used as binders for water-based coating compositions which can be deposited on substrates by flow, dip, spray and roll coating as well as by cationic electrodeposition.

Unfortunately, the art-known cationic solubilizing groups are limited in scope. This is all the more so for acrylic polymers in that they are generally derived from a limited group of amine-containing monomers or from glycidyl (meth)acrylate, the latter being reacted with amine after polymerization. Such monomers are relatively expensive, and some are of limited availability. Moreover, resins solubilized with such monomers characteristically having the following disadvantages: the presence of the amino nitrogen in the film causes discoloration of white and pastel coatings, inhibits oxidative cure and gives the coating a basic character which inhibits acid-catalyzed cures such as with aminoplast crosslinking agents.

These disadvantages have been overcome by using amine solubilizing groups which cleave and volatilize during curing. Such a technique is shown in U.S. application Ser. No. 937,386 filed Aug. 28, 1978 assigned to PPG Industries which discloses resinous compositions in which the amine solubilizing groups are incorporated into the resin via a Michael addition reaction; the amines used therein are volatile under curing conditions, i.e. at an elevated temperature, the amine is cleaved from the resin and volatilizes. An example of the resinous compositions disclosed in the above mentioned patent application are acrylic polyols transetherified with unsaturated compounds such as N-(alkoxymethyl)acrylamide to give polymers with pendant unsaturation which are capable of a Michael addition reaction with a primary or secondary amine.

The present invention provides novel polymers and amine-containing resinous compositions which are free of the afore-described disadvantages. Moreover, the present invention provides an inexpensive means of preparing amine-containing acrylic resinous compositions.

SUMMARY OF THE INVENTION

In accordance with the foregoing, the present invention encompasses novel polymers, the amine-adduct resinous compositions prepared therefrom and the methods of preparing and using both the polymers and the resinous compositions. The instant polymers are characterized by at least one pendant group of the formula:

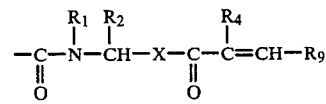

wherein $R_1$, $R_2$, $R_4$, and $R_9$, each independently, is a hydrogen or a hydrocarbyl group, preferably an alkyl group, containing from about 1 to about 6 carbon atoms; and wherein X represents a moiety

of which $R_3$ is hydrogen, or a hydrocarbyl group, preferably an alkyl group, containing from about 1 to about 6 carbon atoms, or a moiety $-O-R_{10}-O-$ of which $R_{10}$ is a alkylene group containing from about 2 to 6 carbon atoms.

More preferably, $R_1$, $R_2$, $R_3$, $R_4$ and $R_9$, each independently, is hydrogen or an alkyl group containing from about 1 to 4 carbon atoms, and $R_{10}$ is an alkylene group containing from about 2 to 4 carbon atoms. Most preferably, $R_1$, $R_2$, $R_3$ and $R_4$, each independently, is hydrogen or methyl; $R_9$ is most preferably a hydrogen, and $R_{10}$ is most preferably ethylene.

The amine-adduct resinous compositions are prepared by aminating the afore-described polymers at the ethylenically unsaturated position of the afore-described pendant group, with ammonia, a primary or secondary amine which may be volatile or non-volatile. Such resinous compositions are characterized by the pendant group of the formula:

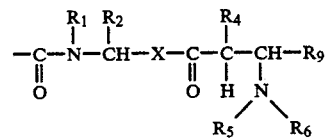

wherein $R_1$, $R_2$, $R_4$, $R_9$, and X are as described hereinbefore, and wherein the radical

is derived from ammonia, a primary or secondary amine. More specifically, $R_5$ and $R_6$ are the same or different and may be hydrogen, or a hydrocarbyl group, preferably an alkyl group, containing from about 1 to 18 carbon atoms, more preferably alkyl or substituted alkyl group such as hydroxyalkyl, containing from 1 to 6 carbon atoms. Also $R_5$ and $R_6$ can form a 5 to 6 membered ring which can include a heteroatom.

The resinous compositions which are particularly desirable are the aqueous compositions in which the amine groups are converted to cationic groups such as amine salt groups. Such compositions can be useful as binders in coating applications such as electrodeposition, either by themselves or in combination with art-known curing agents such as aminoplasts.

Even when used by themselves, the resinous compositions of the instant invention provide films with excellent appearance and substrate adhesion, which self-cure upon baking. These compositions, either by themselves or in combination with art-known curing agents are further advantaged by their low temperature cure of the films obtained therefrom.

DETAILED DESCRIPTION

The polymers of the present invention are prepared by reacting an alpha, beta-ethylenically unsaturated amide or ester with a polymer containing an N-(alkoxyalkyl)amide pendant group.

The alpha, beta-ethylenically unsaturated amides useful herein are represented by the following structure:

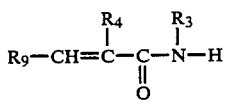

wherein $R_9$, $R_4$ and $R_3$, each independently, is a hydrogen or a hydrocarbyl group, preferably an alkyl group, containing from about 1 to about 6 carbon atoms, more preferably an alkyl group containing from about 1 to 4 carbon atoms. Most preferably $R_4$ and $R_3$, each independently, is a hydrogen or methyl. $R_9$ is most preferably hydrogen. Representative of the alpha, betaethylenically unsaturated amides useful herein is acrylamide. Other non-limiting examples of the alpha, beta-ethylenically unsaturated amides include methacrylamide, N-methylacrylamide, N-methylmethacrylamide, and crotonamide.

The alpha, beta-ethylenically unsaturated esters useful herein are represented by the following structure:

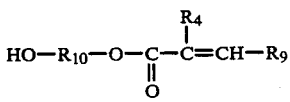

wherein $R_4$ and $R_9$ are as described hereinbefore and wherein $R_{10}$ is an alkylene group containing from about 2 to 6 carbon atoms, more preferably from 2 to 4 carbon atoms. $R_{10}$ is most preferably ethylene. Representative of the alpha, beta-ethylenically unsaturated esters useful herein is hydroxyethyl acrylate. Other non-limiting examples of alpha, beta-ethylenically unsaturated esters include hydroxypropyl acrylate, hydroxypropyl methacrylate and hydroxyethyl methacrylate.

In preparing the preferred embodiments of the present invention, the polymer containing the N-(alkoxyalkyl)amide pendant group is an acrylic copolymer. The acrylic copolymer containing an N-(alkoxyalkyl)amide group can be prepared by copolymerizing ethylenically unsaturated monomers, more fully described hereinafter, with another ethylenically unsaturated monomer containing an N-(alkoxyalkyl)amide group. Illustrative of the monomers containing N-(alkoxyalkyl)amide group are those of the structure:

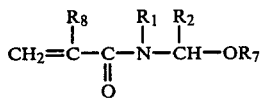

wherein $R_1$ and $R_2$, each independently, is a hydrogen or a hydrocarbyl group, preferably an alkyl group, containing from about 1 to about 6 carbon atoms, more preferably an alkyl group containing from about 1 to about 4 carbon atoms. Most preferably $R_1$ and $R_2$ each independently is hydrogen or methyl. $R_7$ is a hydrocarbyl group, preferably an alkyl group containing from about 3 to about 8 carbon atoms, more preferably 3 to 4 carbon atoms. Most preferably, $R_7$ is an alkyl group containing 4 carbon atoms. $R_8$ is hydrogen or a hydrocarbyl group, preferably an alkyl group, containing from 1 to 6 carbons, more preferably, an alkyl containing from about 1 to 4 carbon atoms. Most preferably $R_8$ is hydrogen or methyl. Representative of the N-(alkoxyalkyl)amide group-containing monomers is N-(butoxymethyl)acrylamide. Other non-limiting samples thereof include N-(isobutoxymethyl)methacrylamide, N-(ethoxymethyl)acrylamide, and N-(ethoxymethyl)methacrylamide.

In addition to preparing the acrylic copolymer containing an N-(alkoxyalkyl)amide group by the method described hereinabove, it is possible to prepare a copolymer containing a precursor of the (N-alkoxyalkyl)amide group. For example, a copolymer containing acrylamide can be reacted with an aldehyde, preferably a formaldehyde, in the presence of alcohol such as butanol to form an N-(butoxymethyl)amide containing copolymer. Alternatively, a copolymer containing a pendant amide group can be reacted with formaldehyde to form a methylol amide group which can react with alcohol to form the N-(alkoxymethyl)amide containing copolymer. It is, of course, contemplated that equivalent methods of preparing the acrylic copolymer containing an N-(alkoxyalkyl)amide group are intended to be covered by this invention.

Typically, from about 5 percent to about 50 percent, preferably from about 15 percent to about 30 percent of the unsaturated N-(alkoxyalkyl)amide monomer based on total monomer weight, is copolymerized with the other ethylenically unsaturated monomers. Examples of the other ethylenically unsaturated monomers which are copolymerizable with the unsaturated N-(alkoxyalkyl)amide group-containing monomer are:

(1) Mono-olefinic hydrocarbons, that, monomers containing only atoms of hydrogen and carbon, such as styrene, alpha-methylstyrene, alphaethylstyrene, alpha-butylstyrene, and the like;

(2) Halogenated mono-olefinic hydrocarbons, that is, monomers containing carbon, hydrogen and one or more halogen atoms such as alphachloro-styrene, alpha-bromostyrene, 2,5-dichlorostyrene, and 3,4 dichlorostyrene.

(3) Esters of organic acids can be used. Examples include vinyl acetate, vinyl propionate, vinyl benzoate, vinyl chlorobenzoate, vinyl ochlorobenzoate, vinyl-m-chlorobenzoate, methyl methacrylate, ethyl methacrylate, butyl methacrylate, hexyl methacrylate, octyl methacrylate, decyl methacrylate, methyl crotonate, ethyl crotonate, ethyl tiglate; methyl acrylate, ethyl acrylate, butyl acrylate, and 2-ethylhexyl acrylate; allyl chloride, allyl bromide, allyl formate, allyl acetate, allyl benzoate; methallyl esters, methyl alpha-chloroacrylate, and methyl alpha-fluoroacrylate, methyl alpha-cyano acrylate; dimethyl maleate, and diethyl fumarate.

In general, it is preferred that the monomers utilized contain a single $CH_2=C<$ group in the terminal position.

Copolymerization of these monomers is carried out by the conventional free radical-initiated solution polymerization technique, in which the monomers are dissolved in a solvent or a mixture of solvents and polymerized under reflux in the presence of a free radical initiator until the desired molecular weight is obtained.

Free radical initiators which are preferably used are those which are soluble in the polymerization medium, for example azobisisobutyronitrile, 2,2'-azobis(2,4-dimethylvaleronitrile) and ditertiary-butyl peroxide.

Chain transfer agents such as alkyl mercaptans e.g. tertiarydodecyl mercaptan, and ketones such as methyl ethyl ketone, chlorohydrocarbons such as chloroform can optionally be used.

In the copolymerization, the solvent is usually first heated to reflux and a mixture of monomers containing free radical initiator are added slowly to the refluxing solvent. After this addition, catalysts may optionally be added and the reaction mixture held at polymerizing temperatures so as to convert the free content of the reaction mixture into the copolymer. Copolymerization is conducted until the free monomer content is less than 2 percent and preferably less than 0.5 percent of the mixture of monomers. Optionally, a portion of solvent can be distilled to remove unreacted monomers.

With regard to the solvents used herein, it is to be understood that any organic solvent may be used. For water-based compositions, however, solvents which do not adversely affect water dispersibility are used. Examples of these solvents are the mono-alkyl ethers of ethylene with contents of one to four carbon atoms in the alkyl group such as ethylene glycol monoethyl ether and ethylene glycol monobutyl ether. Examples of other suitable solvents are isopropanol, diacetone alcohol, and ethylene glycol monohexyl ether. It is preferred, however, to use solvents such as methyl isobutyl ketone, methyl amyl ketone and methyl ethyl ketone because they have been found to facilitate the reaction described below.

Besides the acrylic copolymers, it is believed that other polymers containing N-alkoxymethylamide pendant group can be used in the preparation of other embodiments of the present invention. Illustrative examples of some of these other polymers are polyesters, polyurethanes and polyepoxides, containing pendant N-alkoxymethylamide groups.

One suitable method of preparing some of these polymers is as follows: the condensation of dimethylolpropionic acid amide with a polycarboxylic acid, or a polyisocyanate or a polyepoxide would form respectively a polyester, a polyurethane or polyepoxide containing a pendant amide group. The amide-containing polymer thus formed can be reacted with a formaldehyde, and alcohol such as butanol to yield the polyester, polyurethane or polyepoxide containing the pendant N-alkoxymethylamide group.

It would, of course, be understood that in the selection or preparation of the polymers useful herein, functional groups which would adversely affect the use of the polymers, for example those which would lead to undesirable gellation or those which would otherwise interfere with the reaction or intended use of the polymers should be avoided.

As mentioned above, the polymer containing the pendant N-(alkoxyalkyl)amide group is reacted with the afore-described alpha, beta-ethylenically unsaturated amide or ester. It is required that the reaction is conducted in the presence of an acid catalyst such as methanesulfonic acid. Other catalyzing acids of moderate to strong acidity are useful herein. Some illustrative examples of these acids are paratoluenesulfonic acid, phosphoric acid, and acetic acid. Optionally, a polymerization inhibitor such as hydroquinone, phenothiazine or 2,6-ditertiary-butyl-4-methylphenol may be used. Typically, the reaction is conducted at elevated temperature, usually about 60° to 130° C. for a period of time sufficient to complete the condensation of the alpha, beta-ethylenically unsaturated amide or ester with the acrylic copolymer, as monitored by infrared spectroscopy or viscosity measurement. The actual temperature and time of reaction will depend on the solvent and acid catalyst that is used.

In the preparation of the preferred embodiment of the present invention, the amount of acrylic copolymer containing the pendant N-(alkoxyalkyl)amide group, and the amounts of alpha, beta-ethylenically unsaturated amide or ester which are reacted would be varied according to the reactants and the requirements of the particular application. In general, the alpha, beta-ethylenically unsaturated amide or ester can be reacted with the acrylic copolymer in the ratio of 0.1 to 1.5 preferably 0.3 to 0.9 equivalent of alpha, beta-ethylenically unsaturated amide or ester per equivalent of acrylic copolymer; the equivalents of acrylic copolymer being determined by the equivalents of unsaturated N-(alkoxyalkyl)amide monomer used in preparing the acrylic copolymer. Preferred embodiments of the instant polymers which are hereby obtained are acrylic polymers.

Particularly preferred are the acrylic polymers characterized by at least one pendant group of the structure:

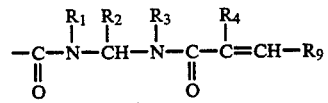

$R_1$, $R_2$, $R_3$, $R_4$ and $R_9$ each independently, is a hydrogen, or a hydrocarbyl group, preferably an alkyl group, containing from about 1 to 6 carbon atoms, more preferably an alkyl group containing from about 1 to about 4 carbon atoms. Most preferably $R_1$, $R_2$, $R_3$ and $R_4$, each independently, is a hydrogen or methyl. $R_9$ is most preferably hydrogen. These acrylic polymers are notably advantaged by their hydrolytic stability.

It is contemplated that polymers of the instant invention, particularly the acrylic polymers can be used for resin or coating applications that can make use of cure through the point of unsaturation, e.g., molding compounds; coatings curable by ultraviolet radiation or an electron beam; and coatings that dry via autoxidation.

For coating applications, it is preferred that the acrylic polymer has a molecular weight of about 5000 to about 50,000. Particularly preferred, in this regard is the acrylic polymer having a molecular weight of about 10,000 to about 30,000, the molecular weight being determined by gel permeation chromatography versus a polystyrene standard.

As stated hereinbefore, the preparation of the resinous compositions of the instant invention comprises the Michael-type addition of ammonia or amines to the instant polymers. The amines useful herein are of the structure

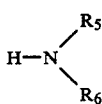

wherein $R_5$ and $R_6$ are the same or different and may be hydrogen or a hydrocarbyl group, preferably an alkyl group, containing from about 1 to about 18 atoms, more preferably an alkyl or substituted alkyl group such as hydroxyalkyl containing 1 to 6 carbon atoms. Also $R_5$ and $R_6$ can form a 5 or 6 membered ring which can include a heteroatom.

In the preparation of the amine adduct, the amine and the polymer are reacted at about 25° to 100° C. Presence of a solvent may be required to effect the complete reaction and formation of the Michael adduct. Generally, secondary amines are preferred to primary amines because primary amines have a potential for gelling the reaction mixture. If primary amines are to be used, precautions should be taken to avoid gelling. For example, excess amines can be used and the excess vacuum-stripped at the completion of the reaction. Similar precautions are needed when ammonia is used. Because of its extra reactivity, the use of ammonia is not preferred.

The amount of amine which is reacted with the polymer can be varied to meet the requirements of the application or end use. Typically, the equivalent ratio of amines to the polymer is in the range of 0.1 to 1.0, preferably 0.5 to 0.9, the amine being considered monofunctional and the equivalents of acrylic polymer being determined by the equivalents of alpha, beta-ethylenically unsaturated amide which have been reacted with the acrylic copolymer.

These amines may be volatile, non-volatile or mixtures thereof. When volatile amines are used to prepare a Michael adduct, and a coating composition containing said Michael adduct is deposited on a substrate to form a film and the film is heated in curing temperatures, the Michael Adduct decomposes releasing free amine which volatilizes under curing conditions. At least 25 percent, preferably, at least 50, and most preferably at least 80 percent by weight of the amine should volatize, leaving a less basic or even neutral film on the substrate. Examples of the primary or secondary amines useful in a preparation of the adduct are those which have a boiling point below 200° C. Non-limiting examples of the amines include n-octylamine, diisopropylamine, ethanolamine, methylethanolamine, piperidine and amylamine. Preferred primary and secondary amines are those which have boiling point falling below 100° C. such as propylamine, diethylamine and dimethylamine.

Mixtures of volatile and non-volatile amines can conveniently be used to improve coating properties. Non-limiting examples of the non-volatile amines include diamylamine, dodecylamine, dioctylamine, and oleylamine.

The instant invention is advantageous in that it provides an inexpensive and convenient means of preparing a wide variety amine-containing resinous composition. It should be appreciated that acrylic polymers of the instant invention are prepared from monomers which are readily available and inexpensive and which, of note, need not contain amines. Art-known amine-containing monomers are expensive and not readily available. Once the polymers of the instant invention are prepared, a wide variety of amines can be easily added by a Michael-type reaction to provide the amine-containing acrylic resinous compositions. The amine-containing acrylic resinous compositions are, accordingly, preferred herein. Those derived from the condensation of the acrylic copolymer and the acrylamide are particularly preferred because of their hydrolytic stability.

The resinous composition of the instant invention can be dissolved in organic solvents or dissolved or dispersed in water. Depending on the structure and molecular weight of the resinous compositions and the concentration of the amine groups present therein, they may be dispersible as prepared or with the aid of a surfactant. However, it is preferred that the resinous compositions contain cationic groups such as amine salt groups which assist in water dispersibility. These amine salt groups can be obtained by at least partially neutralizing the resinous compositions with acid. Examples of suitable acids include organic and inorganic acids such as formic acid, acetic acid, lactic acid, and phosphoric acid. The extent of neutralization would depend on the particular resinous composition being employed. It is only necessary that sufficient acid be added to disperse the composition in water. Typically, the desired amount of acid will be sufficient to neutralize about 30 to about 100 percent of the amine groups present. Excess acid may be used if desired.

The polymers and the resinous compositions of the present invention can be used by themselves in coating composition or they can be combined with a curing agent.

When they are combined with curing agents, it is preferred that the polymers also contain groups which are reactive at elevated temperatures with a curing agent. Examples of reactive groups are hydroxyl, thiol, and primary amine or secondary amine. Quite conveniently, N-(alkoxyalkyl)-amide groups, left unreacted during the condensation with the acrylamide, provide reactive groups through which certain curing agents such as aminoplasts and cross-link.

The curing agents are those which are capable of reacting with the groups on the polymer to form a crosslinked product. Examples of suitable curing agents are phenolic resins, aminoplasts and polyisocyanates. The polyisocyanates should be capped or blocked so that they will not prematurely react with active hydrogens.

The aminoplasts are aldehyde condensation products of melamine, benzoguanamine, urea or similar compounds. Generally, the aldehyde employed is formaldehyde, although useful products can be made from other aldehydes such as acetaldehyde, crotonaldehyde, acrolein, benzaldehyde, furfural and others. Condensation products of melamine, urea or benzoguanamine are most common and are preferred but products of other amines and amides in which at least one amino group is present can also be employed. For example, such condensation products can be produced from various diazines, triazoles, guanidines, guanamines and alkyl and di-substituted derivatives of such compounds including alkyl and aryl-substituted ureas and alkyl and aryl-substituted melamines and benzoguanamines. Examples of such compounds are N,N-dimethyl urea, N-phenyl urea, dicyandiamide, formoguanamine, acetoguanamine, 6-methyl-2,4-diamino-1,3,5-triazine, 3,5-diaminotriazole, triaminopyrimidine, 2,4,6-triethyltriamine-1,3,5-triazine and the like.

These amine-aldehyde and amide-aldehyde condensation products contain methylol groups or similar alkylol groups depending upon the particular aldehyde employed. If desired, these methylol groups can be etherified by reaction with an alcohol. Various alcohols are employed for this purpose including essentially any monohydric alcohol, although the preferred alcohols contain from 1 to 4 carbon atoms such as methanol, ethanol, isopropanol and n-butanol.

The aminoplast curing agent usually constitutes about 1 to 60 and preferably 5 to 40 percent by weight of the resinous composition based on total weight of the polymer and aminoplast.

The capped or blocked isocyanates which may be employed in the compositions of the present invention may be any isocyanate where the isocyanate groups have been reacted with a compound so that the resultant capped isocyanate is stable to active hydrogens at room temperature, that is 20° to 30° C., but reactive with active hydrogens at elevated temperatures, usually between about 90°-200° C.

In the preparation of the capped organic polyisocyanates, any suitable organic polyisocyanate including aliphatic, cycloaliphatic and aromatic polyisocyanates may be used. Examples include tetramethylenediisocyanate, isophoronediisocyanate, 4,4'-dicyclohexylmethanediisocyante, 2,4-or 2,6-tolylenediisocyanate and mixtures thereof. High polyisocyanates can be employed such as triisocyanates.

Any suitable aliphatic, cycloaliphatic, aromatic alkyl monoalcohol and phenolic compound may be used as a capping agent in accordance with the present invention, such as, for example, lower aliphatic alcohols containing from 1 to 4 carbon atoms such as methanol and ethanol; cycloaliphatic alcohols such as cyclohexanol; aromatic alkyl alcohols such as phenyl carbinol. Higher molecular weight, relatively non-volatile monoalcohols such as 2-ethylhexanol can be used if desired, to serve as plasticizers in the coating provided by this invention.

Additional capping agents include oximes such as methyl ethyl ketoxime and lactams such as epsilon-caprolactam. Use of oximes and lactams is particularly desirable because the polyisocyanates blocked with these agents unblock and react at relatively low temperatures.

The reaction between the organic polyisocyanate and a capping agent is usually exothermic, therefore, the polyisocyanate and the capping agent are preferably admixed at temperatures of no higher than 80° C. and preferably below 50° C. to minimize the exotherm effect.

The polyisocyanate curing agent can be used in two similar ways. The polyisocyanate can be fully capped, that is, no free isocyanate groups remain, and then combined with the polymeric Michael adduct to form a two-component system. Or, the polyisocyanate can be partially capped, for example, a half-capped diisocyanate so that the reactive isocyanate groups remain. The partially capped isocyanate can then be reacted with a portion of the active hydrogens in the polymer molecule under conditions which will not unblock the isocyanate nor gel the reaction mixture. This reaction makes the capped isocyanate integral with the polymer molecule. Whether particaly capped or fully capped, sufficient polyisocyanate is present in the coating system so that the equivalent ratio of latent curing capped isocyanate groups to active hydrogens is at least 0.05:1 and preferably about 0.1 to 1:1.

Besides the aminoplast and capped isocyanate curing agents which cure through reaction with the active hydrogens of the polymer material, unsaturated curing agents which cure through reaction with the alpha, beta-ethylenic unsaturation in the polymer can be employed. Self-curing systems in which the polymer polymerizes with itself through the alpha, beta-ethylenic unsaturation are also possible. Examples of suitable unsaturated curing agents are vinyl compounds which are non-volatile under curing conditions containing at least one $CH_2=C<$ group. Examples of suitable vinyl compounds are polyol polyacrylates and polyol polymethacrylates which are obtained by esterifying acrylic and methacrylic acid with polyols containing from 2 to 8 carbon atoms such as ethylene glycol, 1,2- and 1,3-propanediol and 1,2-, 1,3-and 1,4-butanediols, diethylene glycol, triethylene glycol, dipropylene glycol trimethylolpropane and pentaerythritol.

The unsaturated crosslinking agent generally constitutes about 1 to 60 and preferably 2 to 50 percent by weight of the composition based on total weight of the polymer and crosslinking agent.

For aqueous-based systems, the unsaturated crosslinking agent containing acryloyl or methacryloyl groups, can be made cationic in character by reacting with a primary or secondary amine and neutralizing with acid as described generally above.

Additionally, the resinous compositions of the instant invention can be adapted to cure with polyamines as described in U.S. application Ser. No. 937368, filed Aug. 28, 1978, assigned to PPG Industries, which is herein incorporated by reference. In this case, the unsaturated groups on the acrylic polymer are fully reacted with a volatile amine which is added thereto. Also added is a non-volatile amine crosslinker which contains at least two primary or secondary amine groups per mole. On baking the volatile amine is replaced by the amine groups on the crosslinker, thus curing the composition. This method of curing is referred to as Michael exchange.

The resinous compositions of the present invention can be used neat, or as mentioned above in organic solution or in aqueous dispersions. The term "dispersion" as used within the context of the present invention is believed to be a two-phase, transparent, translucent or opaque aqueous resinous system in which the resin is the dispersed phase and water is the continuous phase. Average particle size diameter of the resinous phase is generally less than 10 preferably less than 5 microns. The concentration of the resinous phase in the aqueous medium depends upon the particular end use of the dispersion and in general is not critical. For example, the aqueous dispersion preferably contains at least 1 and usually from about 5 to 50 percent by weight resin solids.

Besides water, the aqueous medium may contain a coalescing solvent. The use of coalescing solvent may be, in some instances, for improved film appearance. These solvents include hydrocarbons, alcohols, esters, ethers and ketones. The preferred coalescing solvents include monoalcohols, glycols and polyols as well as ketones and other alcohols. Specific coalescing solvents include isopropanol, butanol, isophorone, 4-methoxy-2-pentanone, ethylene and propylene glycol, the monoethyl, monobutyl and monohexyl ethers of ethylene glycol and 2-ethylhexanol. The amount of coalescing solvent is not unduly critical and is generally between about 0.01 and 50 percent by weight, preferably about 0.05 to about 25 percent by weight based on total weight of aqueous medium.

In most instances, a pigment composition and, if desired, various additives such as surfactants or wetting agents are included in the dispersion. Pigment composition may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. Pigment content of the dispersion is usually expressed as pigment-to-resin ratio. In the practice of the present invention, the pigment-to-resin ratios are usually within the range of 0.1 to 5:1. The other additives mentioned above are present in the dispersion in amounts of 0.01 to 3 percent by weight based on total weight of resin solids.

The aqueous resinous compositions of this invention are particularly useful for electrodeposition. When the aqueous dispersions described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when sufficient voltage is impressed between the electrodes. The conditions under which electrodeposition is carried out are, in general, similar to those used for electrodeposition of other types of coatings. The applied voltage may be varied and can be, for example, as low as one volt but typically between 50 and 500 volts. The current density is usually between 1.0 ampere and 15 amperes per square foot and tends to decrease during electrodeposition indicating the formation of an insulating film.

The curable resinous compositions of the present invention can also be used in other conventional coating applications such as flow, dip, spray and roll coating.

For electrodeposition and other conventional coating applications, the coating compositions can be applied to a variety of electroconductive substrates especially metals such as steel, aluminum, copper, magnesium and the like, but also include metallized plastic and conductive carbon-coated materials. For other conventional coating applications, the coating compositions can be applied to a variety of electroconductive substrates especially metals such as steel, aluminum, copper, magnesium and the like, but also include metallized plastic and conductive carbon-coated materials. For other conventional coating applications, the compositions can be applied to nonmetallic substrates such as glass, wood and plastic.

After the coating has been applied, it is usually cured by baking at elevated temperatures such as 90° to 210° C. for about 1 to 30 minutes.

Further illustrating the invention are the following examples. These examples and others listed in the specification are not to be construed as limiting the invention as to scope or details, unless otherwise indicated. All parts and percentages in th examples as well as throughout this specification are by weight unless otherwise indicated.

EXAMPLE I

This Example shows the preparation of an acrylic copolymer containing pendant N-(butoxymethyl)amide groups. The charge for the copolymerization was as follows:

| Ingredient | Parts by Weight |
| --- | --- |
| Methyl ethyl ketone | 203 |
| Methyl methacrylate | 450 |
| Ethyl acrylate | 150 |
| Styrene | 150 |
| N—(butoxymethyl) acrylamide | 250 |
| t-Dodecyl mercaptan | 25 |
| VAZO 52* | 15 |
| Methyl ethyl ketone | 100 |
| VAZO 52 | γ1 |
| Methyl ethyl ketone | 15 |
| VAZO 52 | 1 |
| Methyl ethyl ketone | 10 |

*E. I. DuPont DeNemours' 2,2' azobis-(2,4-dimethylvaleronitrile)

In a suitable reaction vessel, the first portion of methyl ethyl ketone was heated to reflux under nitrogen atmosphere. The methyl methacrylate, ethyl acrylate, styrene, N-(butoxymethyl) acrylamide, t-dodecyl mercaptan, and the first portion of VAZO 52 were premixed and added at a steady rate to the reaction vessel over 2½ hours, during which time the reflux was maintained. After another hour of reflux, the mixture was thinned with the second portion of methyl ethyl ketone, and the second portion of VAZO 52 in methyl ethyl ketone was added, dropwise, over a period of ten minutes. This was followed by another hour of reflux which was then followed by the addition of the third portion of VAZO 52 in methyl ethyl ketone, dropwise. Another two hours of reflux was allowed to complete the copolymerization.

EXAMPLE IB

The Example shows preparation of an acrylic polymer characterized by the pendant group of the formula

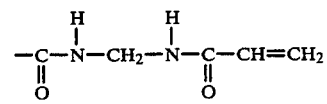

by reacting acrylamide with the copolymer prepared in Example IA. The following charge was used:

| Ingredient | Parts by Weight |
| --- | --- |
| Copolymer of Example IA | 1375 |
| IONOL | 5 |
| Phenothiazine | 0.1 |
| Acrylamide | 77 |
| Methanesulfonic acid | 2 |
| Methyl ethyl ketone | 10 |
| Methyl ethyl ketone | 783 |

*2,6-di-t-butylmethylphenol, manufactured by the Shell Chemical Company.

The acrylamide, phenothiazine and IONOL were added to the acrylic copolymer at 70° C. An air sparge was introduced, and a sample was reduced with an equal weight of 2-ethoxyethanol to measure the viscosity (Gardner-Holdt C at 25° C.). The methanesulfonic acid in methyl ethyl ketone was then added, and the reaction mixture was held at 70° C. for four and a half hours during which time the viscosity increased to Gardner-Holdt H, reduced as above with 2-ethoxyethanol. The mixture was then reduced with additional methyl ethyl ketone. The product was found to have an unsaturation equivalent of 162 grams and to be 45.8% in solids content.

EXAMPLE II

This example shows the preparation of the Michael adduct resinous composition via the amination of an acrylic polymer prepared as described in Example I. The preparation entails the copolymerization in the manner of Example IA, using the following charge:

| Ingredient | Parts by Weight |
|---|---|
| Methyl isobutyl ketone | 333 |
| Methyl methacrylate | 400 |
| Ethyl acrylate | 150 |
| Styrene | 200 |
| N—(butoxymethyl)-acrylamide | 250 |
| t-Dodecyl mercaptan | 30 |
| VAZO 52 | 18 |
| VAZO 52 | 1 |
| Methyl isobutyl ketone | 10 |
| VAZO 52 | 1 |
| Methyl isobutyl ketone | 10 |

The copolymer thus prepared was condensed wit acrylamide in the manner of Example IB. The charge for the condensation was as follows:

| Ingredient | Parts by Weight |
|---|---|
| The above copolymer | 1403 |
| Hydroquinone | 5 |
| Phenothiazine | 0.1 |
| Acrylamide | 77 |
| Methanesulfonic acid | 2 |

The condensation product thus prepared was then aminated to form a Michael adduct. The charge for the amination was as follows:

| Ingredient | Parts by Weight |
|---|---|
| The above condensation product | 1487 |
| Dimethylamine (40% aqueous) | 103 |
| 2-Phenoxyethanol | 207 |

Immediately upon completion of the condensation of the acrylic copolymer with acrylamide, the aqueous dimethylamine was added thereto from a dropping bottle over a temperature range of 70°–80°. Addition was complete in 15 minutes, whereupon the resulting amine-containing acrylic resinous composition was stirred at 80° C. for two hours and then diluted with 2-phenoxyethanol. The resulting resinous composition contained 0.485 milliequivalents of amine per gram of resin and had a solids content of 59.1%.

EXAMPLE III

This example further shows the preparation of the Michael adduct resinous composition prepared in the manner of Example II except that IONOL (2,6-ditertiary-butyl-4-methyl-phenol from Shell Chemical Company) was substituted for hydroquinone and TEXANOL (2,2,4-trimethylpentane-1,3-diol monoisobutyrate, manufactured by Eastman Chemical) was substituted for 2-phenoxyethanol. The resin was dispersed in deionized water with the aid of lactic acid using the following charge:

| Ingredient | Parts by Weight |
|---|---|
| The Michael adduct resinous composition | 200.0 |
| Lactic acid (88% aqueous) | 7.7 |
| Deionized water | 310.0 |

The resin was blended with lactic acid, and water was slowly added with rapid agitation. Untreated and zinc phosphated steel panels were then dipped into this aqueous dispersion, removed, and the panels baked at 175° C. for 40 minutes to form hard, cured coatings that had excellent solvent resistance. The coating on untreated steel was only dulled by 100 acetone double rubs and the coating on zinc phosphate-pretreated steel required 80 acetone double rubs to remove it.

EXAMPLE IV

This example illustrates the preparation of the aqueous dispersion of the resinous compositions and the use thereof in cationic electrodeposition. A Michael adduct was prepared essentially in the manner of Example II and dispersed in water with the aid of lactic acid, using the following charge:

| Ingredient | Parts by Weight |
|---|---|
| Acrylic copolymer of Example IA | 1403.0 |
| IONOL | 5.0 |
| Acrylamide | 90.0 |
| Methanesulfonic acid | 2.0 |
| Methyl isobutyl ketone | 25.0 |
| 2-Phenoxyethanol | 207.0 |
| Dimethylamine (40% aqueous) | 103.0 |
| Lactic acid (88% aqueous) | 79.1 |
| Deionized Water | 4210.0 |

The aqueous dispersion was prepared by pouring the Michael adduct into a rapidly stirred solution of the lactic acid in the deionized water.

After further reduction to 10% solids, this aqueous resinous composition was used to cathodically electrocoat untreated and zinc phosphate-pretreated steel panels. The panels were coated at 150 volts for 90 seconds to produce insulating films with good appearance and excellent adhesion to the substrate. When baked at 177° C. for 30 minutes, hard, glossy films with slight orange peel appearance were obtained. The films obtained at this temperature were removed by 20–30 acetone double rubs. When baked at 191° C. for 30 minutes, films with similar appearance were obtained; they had good acetone resistance, in that, about 70–80 acetone double rubs on the zinc phosphate-pretreated steel, and 80–90 acetone double rubs on the untreated steel, were required to remove the films.

EXAMPLE V

A Michael Adduct resinous composition prepared essentially in the manner of Example II was combined with CYMEL 1156 (butylated melamine-formaldehyde condensate, as manufactured by American Cyanamid). The mixture was solubilized with lactic acid and dispersed with deionized water to form a cationic electrodepositable composition of 10% resin solids. The charge for preparing the composition was as follows:

| Ingredient | Parts by Weight |
| --- | --- |
| Resinous composition prepared as in Example II | 260 |
| CYMEL 1156 | 30 |
| Lactic acid (88% aqueous) | 11.6 |
| Deionized Water | 450 |
| Deionized Water | 1350 |

In preparing the dispersion, the lactic acid was dissolved in 450 parts by weight of deionized water and warmed to 50°–60° C. The resinous composition and the Cymel 1156 were blended separately in a stainless steel beaker at 25° C. The lactic acid solution was then added in one portion to the resin blend. The blend was then further diluted gradually with 1350 parts by weight of deionized water.

Untreated steel and zinc phosphate-pretreated steel were cathodically electrocoated at about 150–200 volts for 90 seconds to produce fair to good insulation with excellent appearance and excellent substrate adhesion. Baked at a temperature of 177° C. for 30 minutes, smooth, glossy pale yellow films were obtained, which were removed by 20 acetone double rubs. Baking the films for thirty minutes at 191° or 200° C. resulted in smooth, glossy films which were merely dulled by 100 acetone double rubs. Films at the higher temperatures were slightly yellowed.

EXAMPLE VI

A resinous composition prepared essentially in the manner of Example II was combined with BEETLE 80 (butylated urea-formaldehyde resin manufactured by American Cyanamid). The mixture was solubilized with lactic acid and dispersed in deionized water to form a cationic electro-depositable composition of 10% resin solids by the procedure of Example V. The charge for the preparation was as follows:

| Ingredient | Parts by Weight |
| --- | --- |
| Resinous composition prepared as in Example II | 245 |
| BEETLE 80 | 40 |
| Lactic Acid (88% aqueous) | 10.9 |
| Deionized Water | 450 |
| Deionized Water | 1350 |

Zinc phosphate-pretreated steel panels were cathodically electrocoated with this dispersion at 150 volts for 90 seconds to form insulating films with excellent appearance and excellent adhesion to the substrate. When the films were baked for 30 minutes at 177° C., films of about 0.9 mil in thickness were obtained which were glossy and faintly yellow in appearance. The films were somewhat soft, and they were removed by about 25 acetone double rubs. When the wet films were baked at 191° C. for thirty minutes, the acetone resistance of the films was enhanced, in that 100 acetone double rubs only dulled the film's appearance.

EXAMPLE VII

This example illustrates the Michael exchange cure of the resinous compositions of the instant invention. A resinous composition comprising a Michael adduct prepared essentially in the manner of Example II was blended with a polyamine cross-linker; the blend was dispersed in water to prepare a bath for cathodic electrodeposition.

EXAMPLE VIIA

The preparation of the Michael adduct comprised copolymerization, the condensation with acrylamide and the amination of the polymer in substantially in the manner of Example II.

The charge for the copolymerization was as follows:

| Ingredient | Parts by Weight |
| --- | --- |
| Methyl ethyl ketone | 203.0 |
| Methyl methacrylate | 450.0 |
| Ethyl acrylate | 150.0 |
| Styrene | 150.0 |
| N—(butoxymethyl)-acrylamide | 250.0 |
| t-Dodecyl mercaptan | 25.0 |
| VAZO 52 | 15.0 |
| VAZO 52 | 1.0 |
| Methyl ethyl ketone | 15.0 |
| VAZO 52 | 1.0 |
| Methyl ethyl ketone | 15.0 |
| Methyl ethyl ketone | 100.0 |
| The above copolymer | 1375.0 |
| IONOL | 5.0 |
| Phenothiazine | 0.1 |
| Methanesulfonic acid | 2.0 |
| Methyl ethyl ketone | 10.0 |
| Acrylamide | 77.0 |
| 2-Phenoxyethanol | 207.0 |
| Dimethylamine (40% aqueous) | 116.0 |

EXAMPLE VIIB

The polyamine crosslinker was prepared using the following charge:

| Ingredient | Parts by Weight |
| --- | --- |
| EPON 1001* | 1395.0 |
| PCP 0200** | 403.0 |
| Xylene | 111.0 |
| Benzyldimethylamine | 5.1 |
| Diethylene-triamine diketimine*** | 513.0 |
| Methyl ethyl ketone | 473.0 |

*Bisphenol A epoxy resin (Shell Chemical Co.) having an epoxy equivalent of 500.
**Polycaprolactonediol (Union Carbide Co.) having a hydroxyl equivalent of 265.
***Prepared from the condensation of diethylenetriamine with an excess of methyl isobutyl ketone, approximately 75% in methyl isobutyl ketone.

The epoxy resin, diol, and xylene were heated under N$_2$ to the reflux temperature. Water was removed in a Dean-Stark trap until the resin mixture was completely dry. The resin was then cooled to 130° C. and the amine catalyst was added. After 90 minutes at this temperature, the viscosity had increased (Gardner Holdt H+, reduced with an equal weight of 2-ethoxyethanol). Measurement of epoxy equivalent at this point gave a value of 1120 grams per equivalent at 100% solids. The mixture was immediately cooled to 110° C. and reacted with the diketimine for two hours at this temperature before cooling and diluting with methyl ethyl ketone.

EXAMPLE VIIC

The crosslinker and resinous composition prepared in the aforedescribed manner were blended; an aqueous dispersion of the blend was cathodically electrocoated. The following charge was used:

| Ingredient | Parts by Weight |
|---|---|
| Michael adduct from Example VIIA | 1792.0 |
| Polyamine cross-linker from Example VIIB | 393.0 |
| Lactic acid (88% aqueous) | 92 |
| Deionized Water | 2160.0 |
| Lactic acid (88% aqueous) | 40.0 |

The two resin components were blended together at 70° C. for 20 minutes. The mixture was then poured into a stirred solution of lactic acid in water. To improve dispersion quality, additional acid was added at this point before the dispersion was thinned further with water.

A portion of this dispersion was thinned to approximately 15% solids. Zinc phosphated-pretreated steel substrates immersed in this dispersion were electrocoated by using 100 volts for 90 seconds at room temperature. The films had excellent wet appearance, adhesion and insulation. Baked at 300° F. (148° C.) for thirty minutes, hard films were obtained. The films were 0.4 to 0.6 mils in thickness. About 15 acetone double rubs were required to remove the film. Baked at 350° F. (177° C.) for 30 minutes fairly hard films were obtained. About 25 acetone double rubs were required to remove the film. When baked at 400° F. (204° C.) for thirty minutes very hard films were obtained which required a hundred acetone double rubs to remove the film.

EXAMPLE VIII

This example shows the preparation of instant acrylic polymer by the condensation of an ethylenically unsaturated ester with an acrylic copolymer containing pendant N-(butoxymethyl)amide groups.

The acrylic copolymer was prepared in the manner of Example IA, using the following charge:

| Ingredient | Parts by Weight |
|---|---|
| Methyl ethyl ketone | 203 |
| Methyl methacrylate | 450 |
| Ethyl acrylate | 150 |
| Styrene | 150 |
| N—(butoxymethyl)acrylamide | 250 |
| t-Dodecyl mercaptan | 25 |
| VAZO 52 | 15 |
| Methyl ethyl ketone | 100 |
| VAZO 52 | 1 |
| Methyl ethyl ketone | 15 |
| VAZO 52 | 1 |
| Methyl ethyl ketone | 10 |

The acrylic copolymer thus prepared was condensed with an alpha, beta-ethylenically unsaturated ester, using the following charge:

| Ingredients | Parts by Weight |
|---|---|
| The above copolymer | 1375 |
| IONOL | 5 |
| Phenothiazine | 0.1 |
| Hydroxyethyl acrylate | 252.0 |
| Methanesulfonic acid | 2 |
| Methyl ethyl ketone | 10 |
| Methyl ethyl ketone | 783 |

The hydroxyethyl acrylate, phenothiazine and IONOL were added to the acrylic copolymer at 70° C. An air sparge was introduced, and a sample was reduced with an equal weight of 2-ethoxyethnol to measure the viscosity which was less than A on the Gardner-Holdt Scale at 25° C. The methanesulfonic acid in methyl ethyl ketone was then added, and the reaction mixture was held at 70° C. for five hours during which time the viscosity, measured as above, increased to A+.

The acrylic polymer thus prepared was aminated in the manner of Example II to form an acrylic resinous composition which was then dispersed in water and then electrocoated.

The charge for preparing the acrylic resinous composition and the aqueous dispersion thereof was as follows:

| Ingredient | Parts by Weight |
|---|---|
| The acrylic polymer | 1534.0 |
| Dimethylamine (40% aqueous) | 244.8 |
| Texanol | 207.0 |
| Lactic acid (88% aqueous) | 167.0 |
| Water | 2160.0 |
| Lactic acid (88% aqueous) | 11.1 |
| Water | 2100.0 |

The acrylic resinous compositions at 70° C. was dispersed by adding it to a stirred solution of the first portion of lactic acid in the first portion of water. To this dispersion was added the additional lactic acid followed by thinning with the additional water.

Untreated steel panels were electrocoated in this dispersion at 100 volts for 90 seconds at room temperature. Films having good insulation and substrate adhesion were obtained. When baked at 350° F. (177° C.), hard films of 0.5 to 0.8 mil thickness were obtained; it took 20 acetone double rubs to remove the films.

While the illustrative embodiments of the invention have been described hereinabove with particularity, it will be understood that various modifications will be apparent to and can be readily made by those skilled in the art without departing from the scope or spirit of the invention. Accordingly, it is intended that claims directed to the invention be construed as encompassing all aspects of the invention which would be treated as equivalents by those skilled in the art to which the invention pertains.

I claim:

1. A non-gelled film-forming polymer characterized by at least one pendant group of the formula:

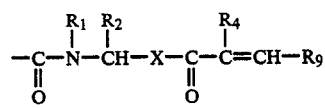

wherein $R_1$, $R_2$, $R_4$, and $R_9$, each independently, is a hydrogen or an alkyl group containing from about 1 to about 6 carbon atoms; and wherein X represents a moiety

of which $R_3$ is a hydrogen, or an alkyl group containing from about 1 to 6 carbon atoms, or a moiety —O—$R_1$-

O—O— of which $R_{10}$ is an alkylene group containing from about 2 to 6 carbon atoms.

2. A polymer according to claim 1 wherein $R_1$, $R_2$, $R_3$, $R_4$ and $R_9$, each independently, is a hydrogen or an alkyl group containing from about 1 to 4 carbon atoms, and $R_{10}$ is an alkylene group containing from 2 to 4 carbon atoms.

3. A polymer of claim 2 wherein $R_1$, $R_2$, $R_3$, and $R_4$, each independently, is a hydrogen, or methyl.

4. A polymer according to claim 2 wherein $R_9$ is hydroen and $R_{10}$ is ethylene.

5. A polymer according to claim 1 which is an acrylic polymer.

6. An acrylic polymer according to claim 5 which is characterized by at least one pendant group of the formula:

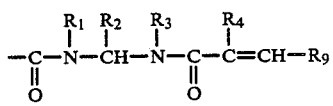

wherein $R_1$, $R_2$, $R_3$, $R_4$, and $R_9$, each independently, is a hydrogen or an alkyl group containing from about 1 to 6 carbon atoms.